United States Patent [19]

Togashi et al.

[11] Patent Number: 4,513,802

[45] Date of Patent: Apr. 30, 1985

[54] REDUCED ROLLING RESISTANCE PNEUMATIC RADIAL TIRE AND METHOD OF MANUFACTURING THE SAME

[75] Inventors: Minoru Togashi, Tokyo; Kenshiro Kato; Shin-ichi Furuya, both of Higashimurayama, all of Japan

[73] Assignee: Bridgestone Tire Company Limited, Tokyo, Japan

[21] Appl. No.: 454,390

[22] Filed: Dec. 29, 1982

[30] Foreign Application Priority Data

Mar. 16, 1982 [JP] Japan ................................ 57-40231
Sep. 13, 1982 [JP] Japan ................................ 57-158013

[51] Int. Cl.$^3$ ........................ B60C 3/00; B60C 15/06
[52] U.S. Cl. ............................ 152/353 R; 152/352 R; 152/356 R; 152/362 R
[58] Field of Search ........... 152/330 R, 352 R, 352 A, 152/353 R, 353 C, 353 G, 354 R, 354 RB, 356 R, 356 A, 362 R, 362 CS

[56] References Cited

U.S. PATENT DOCUMENTS

| | | | |
|---|---|---|---|
| 3,757,844 | 11/1973 | Verdier | 152/361 FP |
| 4,037,637 | 7/1977 | Arimura et al. | 152/352 R |
| 4,155,392 | 5/1979 | Duderstadt et al. | 152/209 R |
| 4,345,634 | 8/1982 | Giron | 152/353 R |
| 4,387,758 | 6/1983 | Matsuda et al. | 152/352 R |
| 4,393,912 | 7/1983 | Gouttebessis | 152/352 R |
| 4,445,560 | 5/1984 | Musy | 152/353 C |
| 4,481,994 | 11/1984 | Rommier | 152/352 R |

FOREIGN PATENT DOCUMENTS

2913949 10/1979 Fed. Rep. of Germany ... 152/352 R
2002298 2/1979 United Kingdom.

*Primary Examiner*—Lois E. Boland
*Attorney, Agent, or Firm*—Sughrue, Mion, Zinn, Macpeak, and Seas

[57] ABSTRACT

A pneumatic radial tire is adapted to improve or reduce the rolling resistance and simultaneously to improve the steering stability and riding comfortability against vibration during running without adversely affecting the wet performance and durability by making higher the carcass maximum width position and the carcass curvature reverse position, or enlarging the curvature of the carcass in the radially outer zone of the carcass maximum width position and simultaneously the carcass curvature reverse extent in the radially inner zone of the sidewalls so as to intentionally deviate from the naturally equilibrated configuration.

A method of manufacturing a reduced rolling resistance pneumatic radial tire uses a mold for vulcanizing and forming the tire therein, which mold has a particular shape of cavity having a foot width 20–50% wider than a rim width and diverging progressively from shoulder corresponding portions to the wider foot portion of the cavity.

17 Claims, 11 Drawing Figures

FIG_7

FIG_8

REDUCED ROLLING RESISTANCE PNEUMATIC RADIAL TIRE AND METHOD OF MANUFACTURING THE SAME

BACKGROUND OF THE INVENTION

1. Field of the Invention

This invention relates to a pneumatic radial tire having low rolling resistance and a method of manufacturing the same. More particularly this invention relates to a tire adapted to improve various tire performances, inter alia to effectively reduce the rolling resistance by properly modifying a radial surface profile of a carcass.

2. Description of the Prior Art

It is known that in order to reduce the rolling resistance of a tire it is necessary to reduce the energy which is to be consumed due to periodic stresses and strains caused in the tire while rolling. It is a reasonable assumption that rates of consumed energies at respective portions of tires are approximately 34% at treads, 27% at buttress portions, 25% at sidewalls and 14% at bead portions according to a result of analysis on percentages of consumed energies of so-called radial carcass tires whose practical usefulness has been recognized under normal used conditions that is, inflated at internal pressure of the order of at the most 2 kg/cm$^2$.

The tread has the largest contribution to the rolling resistance of the tire, and in order to reduce inner friction and hence the rolling resistance, therefore, the compounding ratio of tread rubber has been generally selected so as to increase its resilience. In this case, however, wet performance, which is one of the important performances of the tire, is adversely affected undesirably depending upon the degree of the reduced rolling resistance.

With the above solution, accordingly, the rolling resistance cannot be greatly decreased unless a particular precaution is taken to prevent the wet performance from being lowered. Since an effective method to maintain the wet performance has not been found yet, the above solution does not achieve a significant effect.

It has been further proposed to use for sidewalls the rubber compounding ratio having reduced inner friction in the same manner as in the tread. This proposal, however, serves only to reduce 3% or less of the rolling resistance but adversely affects its damping capacity for vibration caused in the tire and hence its important riding comfortability.

Moreover, it has been proposed to change two layer carcasses into single layer carcasses or to narrow belt widths to make light weight tires in order to reduce the rolling resistance of the tire. However, such proposals unavoidably reduce the rigidity of important portions of the tires to decrease the steering stability, so that only limited effects can be expected.

SUMMARY OF THE INVENTION

In contradistinction to the above solutions of the prior art, the invention of the application resides in the discovery that by suitably modifying the carcass radial surface profile the rolling resistance of a tire can be remarkably reduced and simultaneously the steering stability and the riding comfortability against vibration can also be improved without adversely affecting the wet performance and durability of the tire. This discovery occurred as a result of the inventor's fundamental investigation on deformations of sidewalls of rolling tires subjected to loads.

It is an object of the invention to provide an improved pneumatic tire whose rolling resistance is remarkably reduced with improved steering stability and riding comfortability without adversely affecting its wet performance and durability by making higher the carcass maximum width position and the carcass curvature reverse position, or enlarging the curvature of the carcass in the radially outer zone of the carcass maximum width position and simultaneously the carcass curvature reverse extent in the radially inner zone of the sidewalls so as to intentionally deviate from the naturally equilibrated configuration.

It is another object of the invention to provide a method of manufacturing a pneumatic tire by vulcanizing and forming in a mold comprising a cavity having a foot width 20–50% wider than a rim width to obtain the tire with reduced rolling resistance and improved steering stability and riding comfortability without sacrificing its wet performance and durability.

In order that the invention may be more clearly understood, preferred embodiments will be described, by way of example, with reference to the accompanying drawings.

DETAILED DESCRIPTION OF THE PREFERRED EMBODIMENT

In general, it has been known that the deformation of sidewalls is divided into bending deformation and shearing deformation. The invention resides in a discovery that radially inner portions of sidewalls (in the proximity of bead portions) are subjected to the bending deformation much more than shearing deformation but the radially outer portions of the sidewalls (in the proximity of a tread) are subjected to shearing deformation much more than the bending deformation.

The shearing deformation at the radially outer portions of the sidewalls is more complicated than the bending deformation. The inventors of the present application have carefully investigated these deformations to find the following important points.

First, during rolling under a load the shearing deformation in the radially outer zones of the sidewalls of a tire is relatively small immediately below the load but considerably large in zones which are about to be in contact with and away from a ground surface, which takes a large part of the entire consumed energy.

Second, the shearing and bending deformations are in a reciprocal relationship where when one increases, the other decreases.

In view of the above fact, it has been found that even if the bending deformation concentrated immediately below the load in the radially outer portions of the sidewalls being comparatively thin increases somewhat, entire consumed energy can be reduced by decreasing the shearing deformation playing a large part in the consumed energy.

In order to increase the bending deformation in the radially outer zones of the sidewalls, it is necessary to enlarge a curvature of profile lines of shoulders of a carcass corresponding to the radially outer zones of the sidewalls when the tire mounted on a proper rim is filled with normal inner pressure. The inventors have studied radii R of the curvatures of the profile lines in various manner to find that a radius R whose ratio R/R' to a radius R' of standard circle shown in FIG. 1 is within 0.65–0.85 is effective for the above purpose, which will be explained in more detail later.

Figure 1:
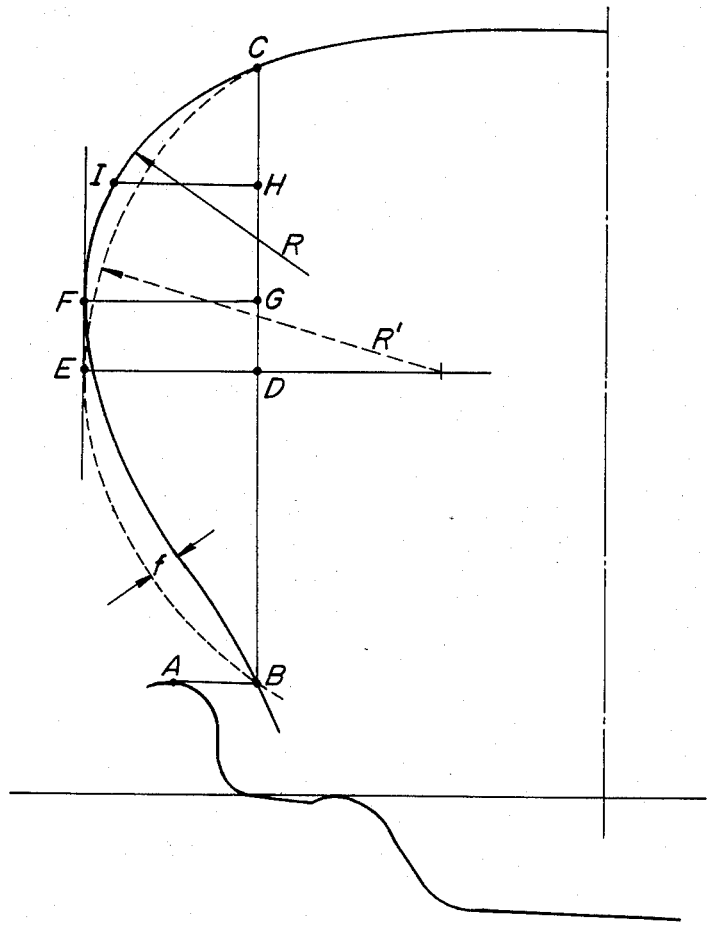
FIG. 1 is a schematic illustration for explaining a relation between a radial surface profile of a tire in a solid line according to the invention and an arc of a standard circle in a broken line.

It should be noticed in this case that the arc or curved line BEC shown in FIG. 1 is a mere reference or standard arc and is inherently different from a carcass radial surface profile under the naturally equilibrated condition. However, the radially outer portions of the sidewalls are relatively thin and have relatively low rigidity, so that the profile of the carcass radial surface under the naturally equilibrated condition substantially approximates the part of the arc EC of the circle. It should be therefore noticed that the above value 0.65–0.85 of the ratio R/R' will be obtained only insofar the configuration under the naturally equilibrated condition is intentionally precluded.

When the ratio R/R' is more than 0.85, it is impossible to obtain the effect for reducing the rolling resistance by reducing the shearing deformation in the radially outer portions of the sidewalls by intentionally precluding the configuration under the naturally equilibrated condition.

When the ratio R/R' is less than 0.65, the bending deformation is concentrated in relatively thick buttress portions to cancel the effect for reducing the rolling resistance resulting from the reduced shearing deformation.

Figure 2:
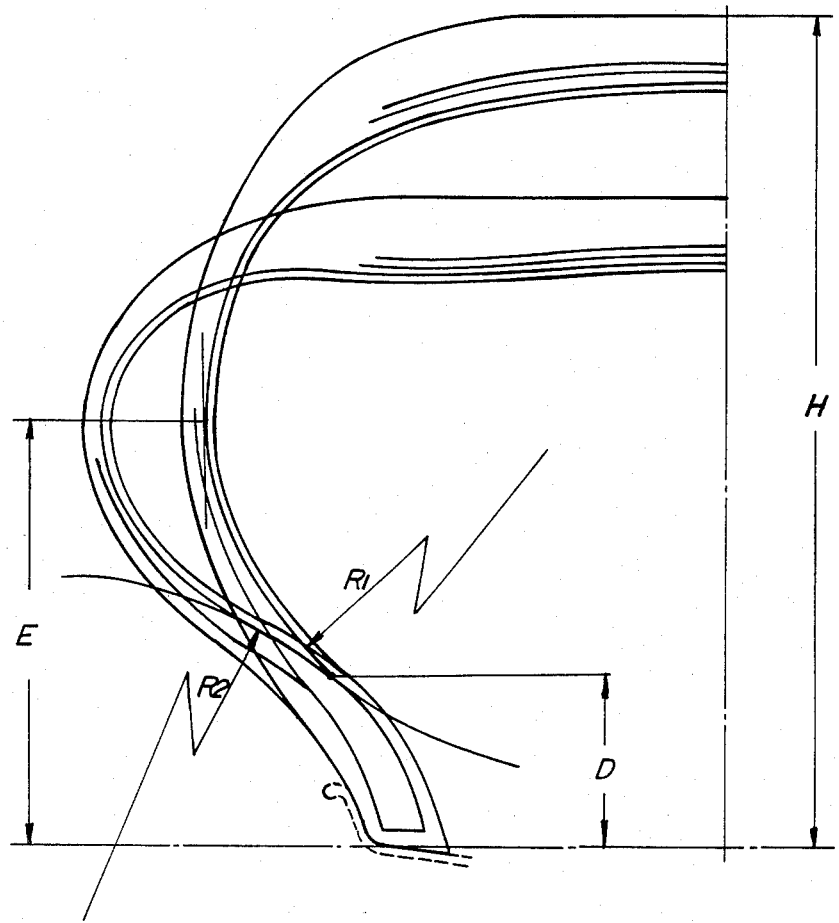
FIG. 2 is a schematic illustration for explaining deformation when a tire is subjected to a load.

Then, the consumed energy due to the bending deformation at the radially inner zones of the sidewalls is generally indicated by the following equation.

$$\text{Consumed energy} = A.E. \tan \delta . (\Delta C)^2 . S \quad (1)$$

where
A: a suitable constant
E: modulus of elasticity of radially inner portion of sidewall
tan δ: loss tangent
ΔC: variation in curvature of radially inner portion of sidewall by bending deformation, and
S: length of radially inner portion of sidewall from the widest portion of carcass It is clear from equation (1) that if the E, tan δ and S are respectively the same, the consumed energy is proportional to $(\Delta C)^2$. The inventors have investigated the variation in curvature of the radially inner portions of sidewalls of actual tires subjected to load to find an important fact that the tire has at its radially inner portion of sidewalls an outwardly extending curvature of radius $R_1$ before deformation, but the sidewalls are reversely deformed to have an inwardly extending curvature of $R_2$ after loading. This is shown in FIG. 2.

The change $(\Delta C)^2$ in curvature at the radially inner portions of the sidewalls in the equation (1) is then indicated as follows.

$$(\Delta C)^2 = \left( \frac{1}{R_1} + \frac{1}{R_2} \right)^2 \quad (2)$$

If the tire mounted on a rim and filled with normal inner pressure has already at the radially inner portions of sidewalls inwardly extending curvatures, the change $(\Delta C')^2$ in curvature is indicated as follows.

$$(\Delta C')^2 = \left( \frac{1}{R_1} - \frac{1}{R_2} \right)^2 \quad (3)$$

From equations (2) and (3) it is clear that $(\Delta C')^2$ is less than $(\Delta C)^2$ and the consumed energy according to the equation (1) becomes correspondingly small.

From this viewpoint, it is effective to provide an inwardly extending curvature at the radially inner portions of the sidewalls when the tire is filled with the normal inner pressure. In consideration of the fact that the bending deformation is primarily caused at the carcass mainly supporting the filled inner pressure, the height of the reversing position of the curvatures (shown as D in FIG. 2) is most desirable to be as high as possible to suitably cause the inwardly extending curvature at the carcass located at the radially inner zones of the sidewalls.

The height D is needed to be equal to the height at a location where the radially inward zones of the sidewalls are reversely deformed from the outward to inward direction. Although this height is dependent upon the construction in the radially inward portions of the sidewalls, the height is needed to be in the range of 20–35% of the height H of the tire mounted on a rim and filled with the normal inner pressure.

As above mentioned, in order to increase the bending deformation in the radially outer zones of the sidewalls, it is necessary to enlarge the curvature of profile lines of shoulders of the carcass when the tire mounted on the proper rim is filled with normal inner pressure. For this purpose, in addition to the height D, it is necessary to properly select the height (shown by E in FIG. 2) of the location where the carcass is the widest in the upper portions of the sidewalls.

The inventors have investigated the height E to find it to be within a range of 50–65% of the height H of the tire mounted on the rim and filled with the normal inner pressure.

In this case, if the value of E exceeds 65% of the H, the bending deformation is concentrated at the relatively thick buttress portions to cancel the effect resulting from the reduced shearing deformation. If the value of E is less than 50% of the H, a very unnatural carcass radial surface profile is formed in conjunction with the height D of the carcass curvature reverse position to adversely affect the tire durability and to make difficult the manufacturing of the tire.

Figure 3A:
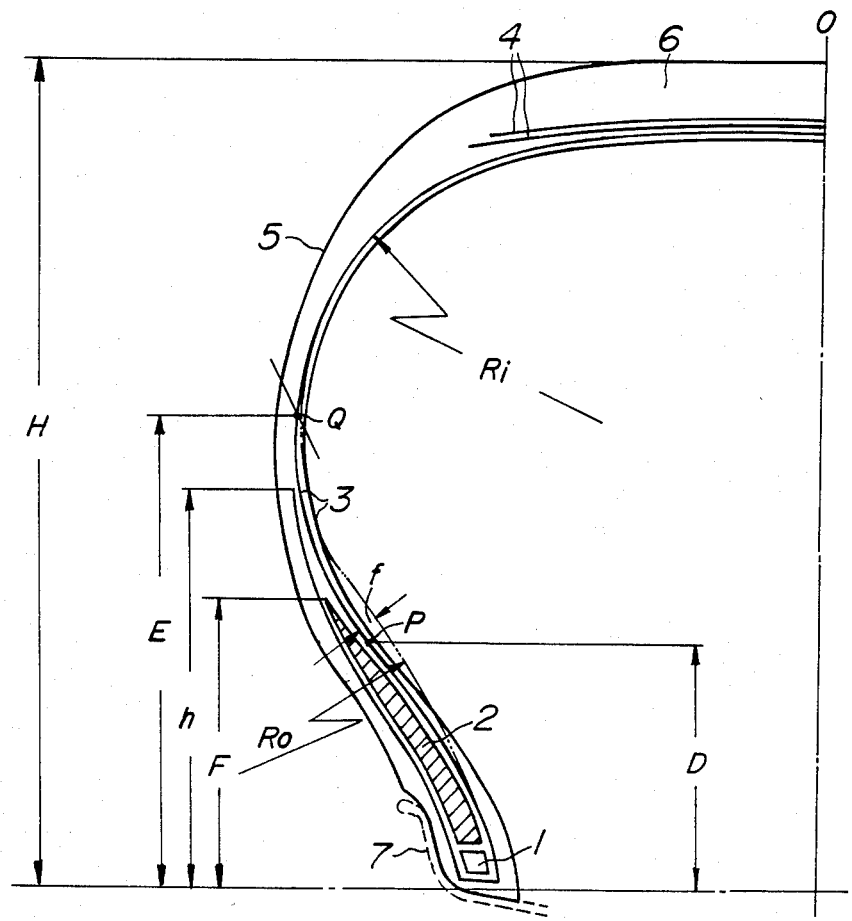
FIG. 3a is a schematic sectional view of the tire according to the invention.

As above mentioned in detail, the present invention deals with a tire including at least one layer of carcass 3 consisting of a ply made of rubber coated organic fiber cords arranged substantially in radial surfaces of the tire and extending about bead wires 1 and returning toward radially outwardly of the tire embracing hard rubber fillers 2 therebetween, at least two layers of belts 4 of rubber coated cords having a high modulus of elasticity and intersecting each other at relatively slight angles for reinforcing the tire in conjunction with the carcass 3, and rubbers of sidewalls 5 on both sides of the carcass 3 and a rubber of a tread 6 outside the belts 4. This is shown in FIG. 3a. When the tire is mounted on a rim 7 and filled with the normal inner pressure, according to the invention, the height E at the location Q where the carcass 3 is the widest is within the range of 50–65% of the height H of the tire and the height D at the location P where the carcass 3 is deformed from the outward to inward direction is within the range of 20–35% of the height H of the tire. It is necessary to form the tire in a mold so that when the carcass 3 is firmly held as formed and vulcanized and the tire is mounted on the rim and filled with an inner pressure corresponding to 5% of the normal inner pressure, the carcass 3 in the radially outer zone has a radius $R_i$ of curvature having its center located inside the carcass 3 between a crown 6 and the location Q of the maximum carcass width, while the carcass 3 in the radially inner zone smoothly continues with the above outwardly extending carcass portion and has a radius $R_o$ of curvature having its center located outside the carcass 3 as shown in a phantom line in FIG. 3a. We have only explained and shown the left half of the tire in FIG. 3a because it is symmetrical with respect to its equatorial line O—O. The same holds true in further explanation and other drawings.

Figure 3B:
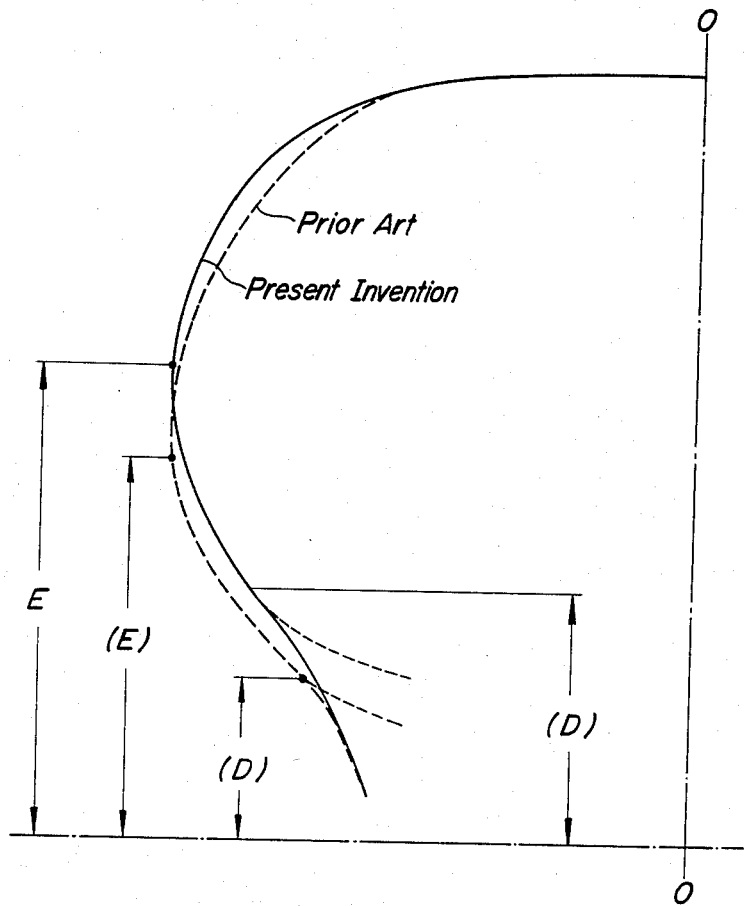
FIG. 3b illustrates a comparison of the carcass radial surface profile of the tire shown in FIG. 3a with a naturally equilibrated carcass profile.

As can be seen from FIG. 3b in comparison of the profile of the carcass according to the invention with the naturally equilibrated carcass radial surface profile (in a broken line in FIG. 3b), it should be noticed that when the tire is mounted on a rim and filled with the normal inner pressure, the profile according to the invention is already better approximated to the deformed profile subjected to a load than in the tire of the prior art. It should be easily understood therefore that the tire according to the invention can decrease the consumed energy due to periodic variation in stress and strain caused by the tire rolling with the aid of the appropriate variation of the carcass radial surface profile when subjected to the load.

Furthermore, the deformation f (FIG. 3a) of the carcass at the radially inner zone when the tire is filled with the normal inner pressure is preferably within a range of 5–10% of the height D at the carcass reverse position.

Organic fiber cords may be used for the carcass 3 such as polyester, nylon, rayon or aromatic polyamide fiber (Kevlar). Metal cords, typically steel cords, organic fiber cords such as rayon, polyester and aromatic polyamide fiber cords and unextensible cords such as glass fiber may be used for the belt 4. These cords are arranged obliquely at slight angles such as 10°–25° with respect to the equatorial line and such a plurality of layers are arranged one above the other to locate their cords intersecting to each other.

In superimposing the belts 4, the respective belt layers may be used as both their edges are cut or auxiliary plies may be used which consist of one or more layers having thermal contractible, for example, nylon cords arranged in substantially parallel with the equatorial line of the tire to cover the edges of the belts. Moreover, at least one of the belt layers may be provided at its both edges with turned portions located inside or outside the other belt or enclosing the cut edges of the other belt.

The rubber filler 2 arranged between the radially innermost portion and radially outwardly returning portion of the carcass 3 is radially outwardly tapered from the top of the bead wire 1 to a location F slightly beyond the height D of the curvature reverse position. The rubber filler has a rubber hardness of 80°–97° in Shore hardness A and physical properties of a loss tangent 0.15–0.25 and a loss modulus $8 \times 10^7 - 2.5 \times 10^8$ dyn/cm².

The end of the radially outwardly returning portion of the carcass extends preferably to a location of a height h which is beyond the radially outer end of the hard rubber filler but radially inward of the carcass maximum width position Q.

Moreover, the inventors have investigated the degree of the reversing the curvature of the carcass to find that the degree can be measured by the maximum distance f between the carcass line FB and arc BE as shown in FIG. 1 and its suitable range is 5–10 mm.

As above mentioned, the arc BEC is a mere standard circle but is different from the carcass radial surface profile based on the natural equilibrated configuration. Since the radially inner portions of the sidewalls have the relatively high rigidity because the carcass extends about the bead core to turn up radially outwardly, between which a rubber filler is located to reinforce the bead portion, the carcass radial surface profile based on the naturally equilibrated configuration is generally positioned inside of the arc BE.

In contrast herewith, the value f of 5–10 mm is obtained only by reversing the curvature of the carcass in the radially inner portions of the sidewalls by intentionally precluding the natural equilibrium configuration and completely different from such equilibrated configuration. If the value of f is less than 5 mm, the effect for reducing the consumed energy according to the principle of the equations (1)–(3) cannot be sufficiently achieved. On the other hand, if the value of f exceeds 10 mm, the tension in the carcass in the radially inner portions of the sidewalls when filled with the inner pressure to adversely affect the durability of the tire, and as the carcass enters inside of the tire, outer surfaces of the tire position on relatively inner sides to adversely affect the fitting of the rim.

Figure 4A:
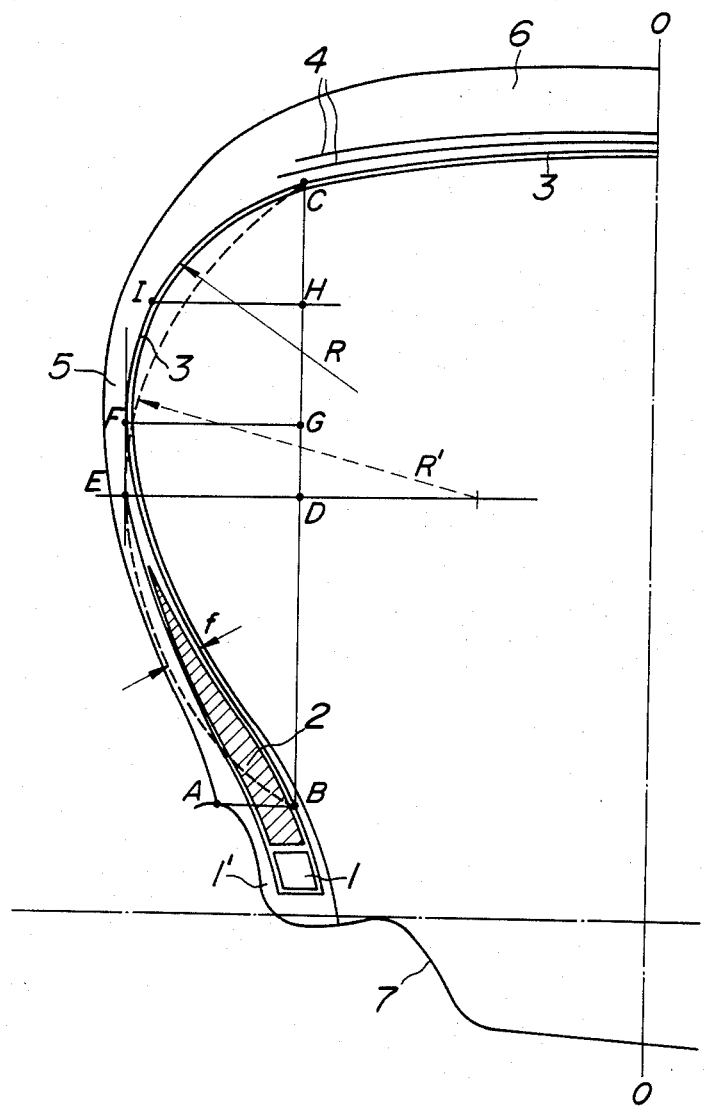
FIG. 4a is a schematic sectional view of the tire of a further embodiment of the invention.

According to a further embodiment of the invention shown in FIG. 4a, therefore, when the tire is mounted on a rim 7 and filled with the normal inner pressure, a radial surface profile of the carcass is selected so that R/R' is within a range of 0.65–0.85 and f is within a range of 5–10 mm to reduce the rolling resistance of the tire, where: A is a point where a flange of the rim 7 starts leaving the outer surface of the tire, B is an intersection of the carcass 3 and a line extending through the point A in parallel with a rotating axis of the tire toward the inside of the tire, C is an intersection of the carcass 3 and a line extending through the point B and radially perpendicular to the rotating axis of the tire, D is a middle point of a line segment BC, E is an intersection of a line passing through the point D and in parallel with the rotating axis of the tire and a line passing through the maximum carcass width point F and perpendicular to the rotating axis of the tire, G is an intersection of the line segment BC and a line passing through the point F and in parallel with the rotating axis of the tire, and I is an intersection of the carcass 3 and a line passing through a middle point H of a line segment GC and in parallel with the rotating axis of the tire, R is a radius of a circle passing through the points F, I and C, R' is a radius of a circle passing through the points B, E and C and f is the maximum distance between the arc BE and the partial arc FB of the carcass 3 in the radial direction of the tire.

Figure 4B:
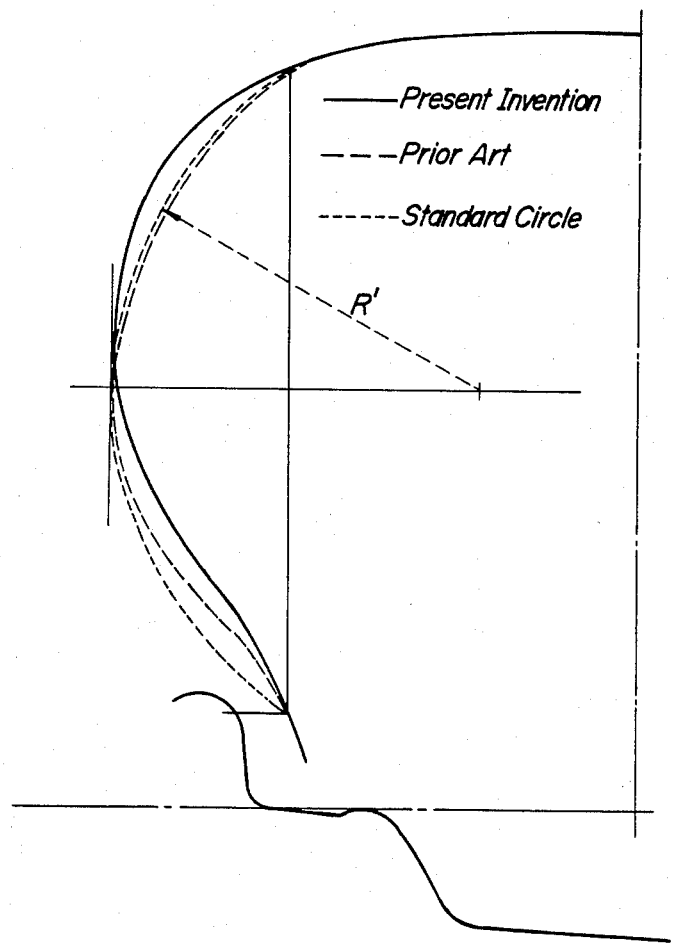
FIG. 4b illustrates a comparison of the carcass radial surface profile of the tire shown in FIG. 4a with the naturally equilibrated carcass profile and a standard circle.

As can be seen from FIG. 4b in the same manner as FIG. 3b, the profile according to the embodiment of the invention has already more approximated to the deformed profile subjected to a load and therefore the tire according to this embodiment can also decrease the consumed energy with the aid of the appropriate variation of the carcass radial surface profile when subjected to the load.

In the embodiment shown in FIGS. 3a and 3b, the materials of the cords for the carcass 3 and materials and arrangement and constitution of the cords for the belt 4 have been described. The same holds true in this embodiment shown in FIGS. 4a and 4b. The tire to which this invention is applied is of course a general radial tire having no particular reinforcing rubber layer at sidewalls, such as non-puncture tires.

In order to maintain the reverse curvatures of the carcasses and provide the value of f of 5–10 mm, it is necessary to give a large bending rigidity to the proximity of bead portions. However, the reinforcement in the proximity of the bead portion with excess reinforcing members tend to adversely affect the decrease of rolling resistance aimed in the present invention. Accordingly, a suitable selection of the component members is important to achieve the object of the invention. As above mentioned, it is one selection to make at least part of the bead filler rubber of a hard rubber stock having a hardness of 80°–97° in Shore A hardness. If the hardness is less than 80°, the effectiveness cannot be significantly accomplished. If the hardness is more than 97°, it gives rise to a disadvantage in durability although it is advantageous for maintaining the carcass radial surface profile.

As mentioned above, the tire according to the invention includes the carcass radial surface profiles precluding the naturally equilibrium configuration of the carcass. This fact can be easily recognized by observing the variation in carcass radial surface profile when the tire is being filled with inner pressure.

Figure 5:
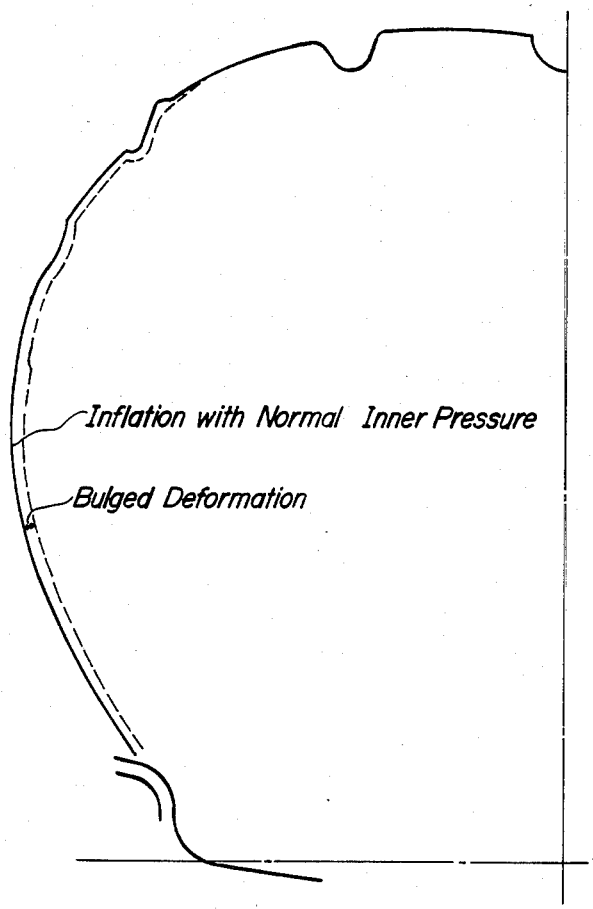
FIG. 5 is a schematic illustration for explaining the deformation of a tire having a naturally equilibrated profile when filled with inner pressure.
Figure 6:
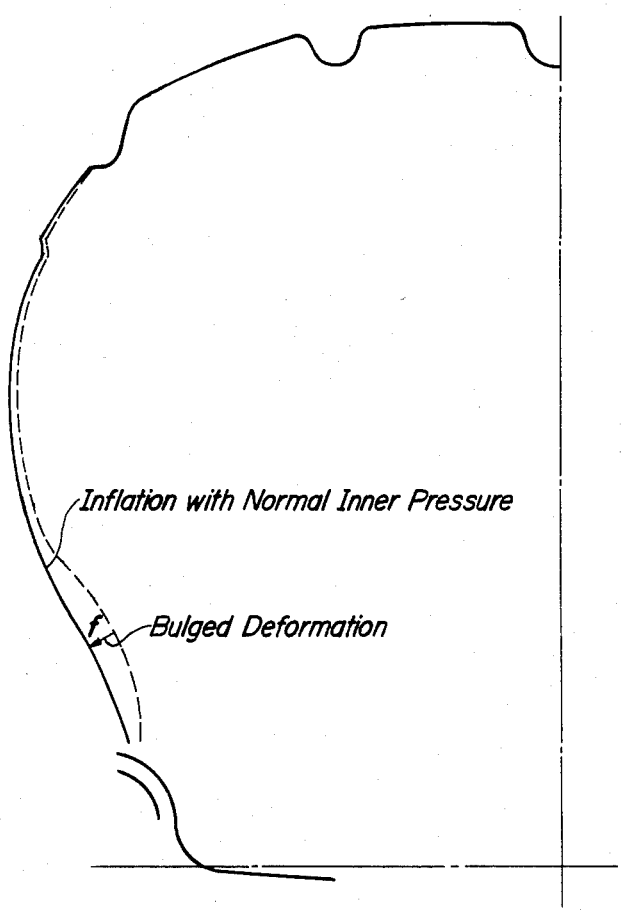
FIG. 6 is a schematic illustration for explaining the deformation of the tire having the carcass radial surface profile according to the invention when filled with inner pressure.

FIGS. 5 and 6 illustrate the variation in carcass profile of tires of 185/70 SR14 each mounted on a rim being filled with the inner pressure from 5% of a nominal pressure to the normal inner pressure. In case of a so-called naturally equilibrated profile, as shown in FIG. 5, an entire sidewall bulges uniformly. In contrast herewith, with the carcass radial surface profile according to the invention, the bulged deformation f in the zone radially inward of the carcass maximum width position is much greater than that in the zone radially outward of the carcass maximum width position which is substantially unnoticeable as shown in FIG. 6. The solid and broken lines in FIGS. 5 and 6 are obtained by reproducing the inner profiles of the carcass radial surfaces by the use of plaster before and after the bulged deformation.

The difference in bulged deformation between the invention and the prior art will of course affect the distribution of tension in the carcasses. With the tire according to the invention, the carcass in the proximity of the bead portions exhibiting the large bulged deformation f is subjected to a higher tension to provide a higher apparent rigidity, while the carcass from the buttress portion to the radially outer portion of the sidewall exhibiting the small bulged deformation is subjected to a relatively low tension to provide a lower apparent rigidity. These facts can reduce the rolling resistance and, in addition, improve the steering stability and riding comfortability against vibration.

First, a tire arranged to provide a slip angle will be considered. In this case, a lateral force acts upon the tire to cause traverse deformation. With the tire according to the invention, because of the high tension in the carcass in the proximity of the bead portions and high apparent rigidity, the tire exhibits a high rigidity against the traverse deformation to provide a high cornering power and a high stability particularly in case of a large slip angle.

Next, a tire going over a protrusion on a road surface will be considered. In this case, the tire deforms much than when the tire is subjected to the normal load. Accordingly, absorption of the deformation by the sidewalls is important for improving the riding comfortability against vibration. It should be appreciated that the tire according to the invention is constituted to lower the tension in the ply from the radially outer portion of the sidewall to the buttress portion, so that the apparent rigidity is lower to easily absorb the deformation, thereby improving the riding comfortability against vibration.

As above described, the subject matter of the carcass radial surface profile renders the carcass curvature reverse position as high as possible. In order to provide such a profile after the tire is filled with a normal inner pressure, it is necesssary to give a large bending rigidity previously to the proximity of bead portions. However, the reinforcing the proximity of the bead portions by the use of reinforcing members more than reasonably required adversely affect the improvement or reduction of the rolling resistance which is the first object of the invention. Accordingly, there is a difficulty in selection of structural members to achieve the object of the invention. The inventors have found that the following two features are suitable for selections of the construction and members for achieving the object of the invention.

(1) A hard rubber having a hardness Hd of 80°–97° (Shore A hardness) is used for part or all of the bead filler rubbers of a tire.

(2) A height of the returning portion of a carcass extending radially outwardly is equal to or higher than the height D of the carcass curvature reverse position.

A bead filler rubber having a hardness less than 80° does not achieve the aimed effectiveness, while a bead filler rubber more than 97° serves to maintain the carcass radial surface profiles but adversely affects the durability of the tire. Using either or both of the above features (1) and (2) effectively exhibits the various performances of the tire according to the invention.

The feature of prohibiting the reinforcement of the proximity of the bead portions using reinforcing members much more reasonably required serves to easily provide the inwardly extending profile of the tire in the zone from the tire maximum width position to the inner most position as the curvature of the carcass reverses in the zone.

As above described, the tire according to the invention comprises at least one layer of carcass consisting of a ply made of rubber coated organic fiber cords arranged substantially in radial surfaces of the tire and extending about bead wires and returning toward radially outwardly of the tire, at least two layers of belts of rubber coated cords having a high modulus of elasticity and intersecting each other at relatively slight angles for reinforcing the tire in conjunction with the carcass, and rubbers of sidewalls on both sides of the carcass and a rubber of a tread outside the belt. Furthermore, it is required for the tire according to the invention to fulfil the following three conditions (a)-(c).

(a) While the tire mounted on a rim is being filled with the inner pressure at from 5% of the normal inner pressure to the normal inner pressure, the deformation in the zone from the tire maximum width position to the radially inner position is relatively large but the deformation in the zone from the tire maximum width position toward radially outward is substantially little.

(b) When the tire mounted on the rim is filled with the normal inner pressure, the height of the carcass maximum width position from a rim base is 50-60% of the height of the tire from the rim base to the outermost surface of the tread.

(c) When the tire mounted on the rim is filled with the normal inner pressure, the height of the carcass curvature reverse position from the rim base is 20-35% of the height of the tire from the rim base to the outermost surface of the tread.

Such a tire fulfilling the above conditions, however, cannot be manufactured by a tire vulcanizing mold having a normal configuration because of the particular shape of the tire intensionally deviating from the naturally equilibrated configuration. The inventors have investigated this problem to find a tire vulcanizing mold having a configuration capable of manufacturing such a tire.

In general, a cavity of a tire vulcanizing mold is determined by modifying somewhat a configuration corresponding to that of a tire mounted on a rim. According to this procedure, the heights of the mold maximum width position and of the mold curvature reverse position are determined by making the tire vulcanizing mold itself commensurate with the carcass radial surface profile of the tire to be manufactured. On the other hand, following the "strength of material" or "applied mechanics" the inventors have studied the variation in the carcass radial surface profile when tires are being filled with inner pressure at from 5% to the normal inner pressure. As the result, the inventors have found that such a variation in configuration arises into the direction reducing its curvature in the zone of large curvature from sidewalls to bead portions, while the variation arises into the direction enlarging its curvature in the zone of small curvature and arises into the direction of plus R in the zone of reverse R, respectively.

For the above, it has been found that the variation in configuration arises into the direction deviating from the target carcass radial surface profile. If the configuration of the vulcanizing mold for manufacturing a tire intentionally deviating from the naturally equilibrated configuration is determined in consideration of this fact, the resultant mold configuration is in fact extremely unbalanced which would give rise to difficulties in manufacture and a tire manufactured in the mold includes large stresses and strains therein when the tire on a rim is filled with the inner pressure, resulting in less durability which is unacceptable for practical use.

Distinct from the prior art, the configuration of the vulcanizing mold according to the invention is quite different from the carcass radial surface profile of the tire mounted on a rim. Namely, the mold according to the invention has a cavity wherein a width of the cavity portion corresponding to the rim for mounting the tire thereon is 20-50% wider (1-25" wider in case of 5" rim) than the width of the rim and the cavity progressively widens from cavity portions corresponding to shoulders of the tire toward the cavity portion corresponding to the rim. The width of the cavity corresponding to the width of the rim is referred herein to as "foot width" which substantially corresponds to a distance between bead heels of the tire. Such a vulcanizing mold results from the systematical investigation on the relation between the mold configuration and stress-strain conditions caused in tires on rims filled with inner pressure. When the tire manufactured in this mold is mounted on a rim narrower than the foot width of the mold the height of the maximum width position of the carcass radial surface profile is higher than that of the maximum width position of the mold and the height of the carcass curvature reverse position in the proximity of the bead portions is also higher than that of the maximum width position of the mold. When the foot width of the mold is less than the width of the rim plus its 20%, the above effect cannot be accomplished. A foot width of the mold more than the width of the rim plus its 50% is undesirable because mounting of the tire on the rim is difficult.

When the tire manufactured in the mold according to the invention mounted on the rim is being filled with inner pressure at from 5% to the normal pressure, the carcass radial surface profile varies in the manner above described. The carcass radial surface profile after filled with the normal inner pressure is maintained in that intentionally deviating from the naturally equilibrated configuration. It should be more appreciated that with the mold according to the invention the variation is carcass radial surface profile during filling the inner pressure is in the direction returning to the carcass radial surface profile upon completion of vulcanizing, so that by mounting the tire on the rim narrower than the foot width, the stress and strain once generated in the tire are released without adversely affecting the durability of the tire.

Figure 7:
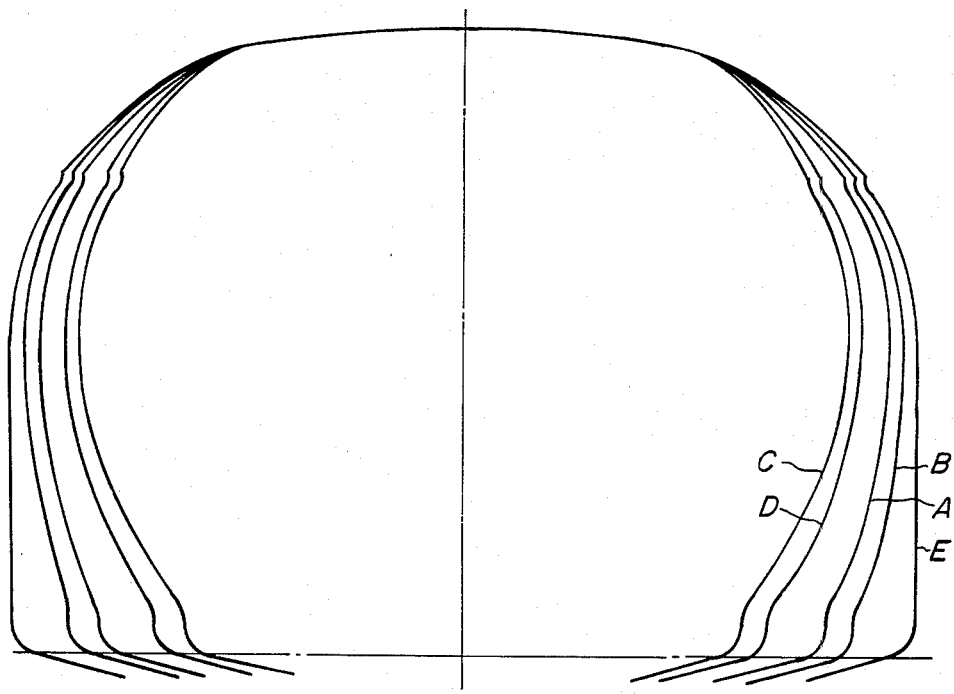
FIG. 7 schematically illustrates various cavity profiles for explaining the mold cavity according to the invention.
Figure 8:
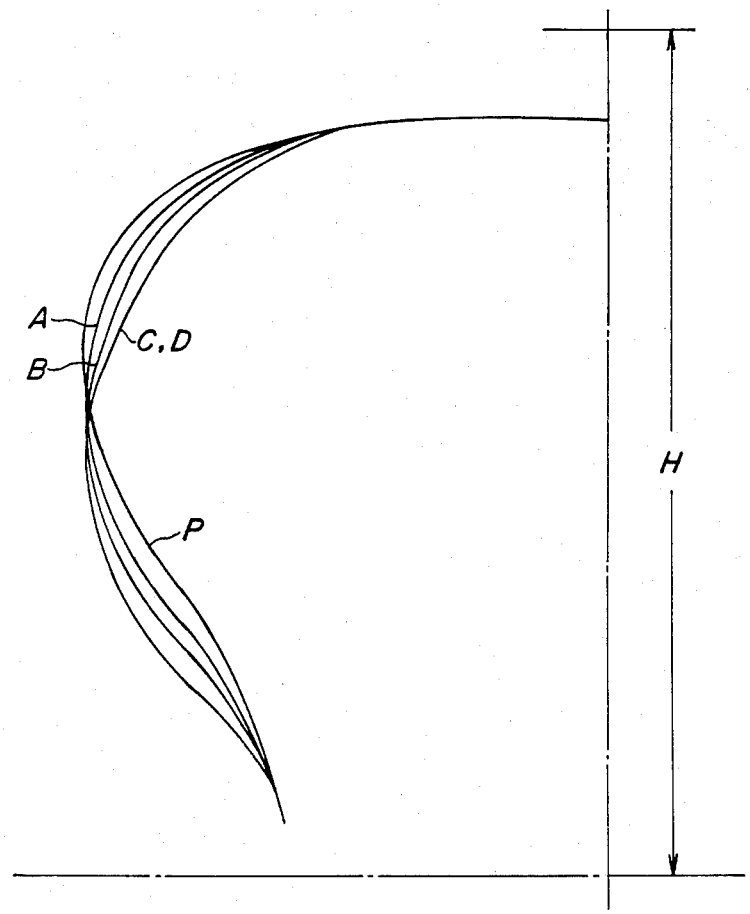
FIG. 8 schematically illustrates carcass radial surface profiles of comparative examples and according to the invention.

FIG. 7 illustrates various profiles of cavities in molds A, B, C, D and E for tires of 185/70 SR14 with rims having a normal width 5". The molds A and B have foot widths 1.5" and 2" wider than 5" rim width, respectively. The mold C has a foot width substantially equal to the 5" rim width. The molds D and E have foot widths 0.5" and 3" wider than 5" rim width, respectively. FIG. 8 illustrates the carcass radial surface profiles of the tires manufactured in the above molds A, B, C, D and E when the tires on the rims are filled with the normal inner pressure, the profiles A, B, C and D corresponding to the tires manufactured in the molds A, B, C and D. It is evident that the profiles A and B deviate from the naturally equilibrated configuration and the profiles C and D substantially coincide with the naturally equilibrated configuration which profiles C and D are not suitable for the purpose of the invention. The tire manufactured in the mold E is not practically used because of the wide distance between bead heels which makes it difficult to mount the tire on the rim. A curve P in FIG. 8 corresponds to a curve of comparative example 2 which will be explained later.

The effect of the tires constructed in the manner above described according to the invention will be explained with reference to embodiments hereinafter.

bers. The larger the index numbers, the better are rolling resistances.

In the test of rolling resistance, the tire was urged against a rotating drum having a 1707 mm diameter to rotatively drive the tire to a predetermined speed and whereupon a driving source for the drum is shut off, so that although inertia forces of the drum and tire tend to continue their rotating movement, they progressively decrease their rotating speeds because the kinetic energy is converted into heat energy due to repeated deformations at tire surfaces in contact with the drum, which heat energy dissipates into the atmosphere. The rolling resistances were calculated by degrees of deceleration during the rotation of the drum and tire owing to their inertia forces.

TABLE 2

| | | Rolling resistance of tire | | | | | |
|---|---|---|---|---|---|---|---|
| | | Tire | | | | | |
| Inner pressure | Speed km/H | Comparative example 1 | Comparative example 2 | Invention 1 | Invention 2 | Invention 3 | Invention 4 |
| 1.7 kg/cm$^2$ | 50 | 100 | 102 | 109 | 111 | 106 | 106 |
| | 80 | 100 | 101 | 112 | 116 | 106 | 106 |
| | 100 | 100 | 102 | 118 | 120 | 108 | 106 |
| | 150 | 100 | 100 | 122 | 126 | 110 | 108 |
| 2.1 kg/cm$^2$ | 50 | 100 | 102 | 110 | 112 | 106 | 106 |
| | 80 | 100 | 101 | 112 | 116 | 106 | 106 |
| | 100 | 100 | 101 | 116 | 121 | 107 | 106 |
| | 150 | 100 | 101 | 120 | 129 | 109 | 107 |
| 2.5 kg/cm$^2$ | 50 | 100 | 100 | 110 | 113 | 106 | 106 |
| | 80 | 100 | 100 | 112 | 116 | 107 | 106 |
| | 100 | 100 | 101 | 116 | 120 | 108 | 106 |
| | 150 | 100 | 101 | 120 | 130 | 110 | 108 |

Note:
All the loads acting upon the tires for the test are the normal load for 1.7 kg/cm$^2$ inner pressure according to JIS.

Dimensions and properties of the tires of the invention and comparative examples are shown in Table 1. Each of carcasses 3 was of one ply including high modulus polyester cords of 1500d/2 arranged at 90° with respect to an equatorial line of the tire. For each tire two belts 4 were used, each including steel cords (twisted structure 1×5×0.25 mm) intersecting cords of the other belt and arranged at approximately 17° with respect to the equatorial line. The height F (FIG. 3a) of fillers was 35% of the height H of the tires. These tires were mounted on 5J rims. Other factors were equal in all the tires.

It can be seen from the Table 2, the tires 1 and 2 according to the invention acheive the remarkable improvement or reduction of the rolling resistance, 10–30% as much as those of the tires of comparative examples. The tire 3 according to the invention is an example having a height of the returning carcass lower than the carcass curvature reverse position, whose effect is somewhat less than those of the tires 1 and 2 according to the invention. The tire 4 according to the invention includes bead filler rubbers having a somewhat lower hardness, which exhibits substantially the same effect as that of the tire 3.

TABLE 1

| | Tires of the invention and comparative example | | | | | | | | |
|---|---|---|---|---|---|---|---|---|---|
| | | | | | | | Bead filler | | |
| Tire | D/H | D/H | h/H | R/R' | f mm | f/D | Loss tangent | Hardness (Shore A) | Loss modulus (dyn/cm$^2$) |
| Comparative example 1 | 46% | 18% | 47% | 1.02 | 3.5 | 0 | 0.195 | 95 | 1.9 × 10$^8$ |
| Comparative example 2 | 67% | 37% | 47% | 0.60 | 11.0 | 12 | " | 95 | " |
| Invention 1 | 57% | 24% | 47% | 0.80 | 6.0 | 7.5 | " | 95 | " |
| Invention 2 | 62% | 33% | 47% | 0.75 | 8.5 | 8 | " | 95 | " |
| Invention 3 | 57% | 22% | 15% | 0.82 | 5.5 | 6 | " | 95 | " |
| Invention 4 | 57% | 21% | 47% | 0.83 | 5.0 | 5.5 | 0.223 | 74 | 3.9 × 10$^7$ |

Note:
Tire size: 185/70 SR14, Normal inner pressure: 1.7 kg/cm$^2$, Rim: 5J-14", Width of rim: 5" (127 mm)

Figure 9:
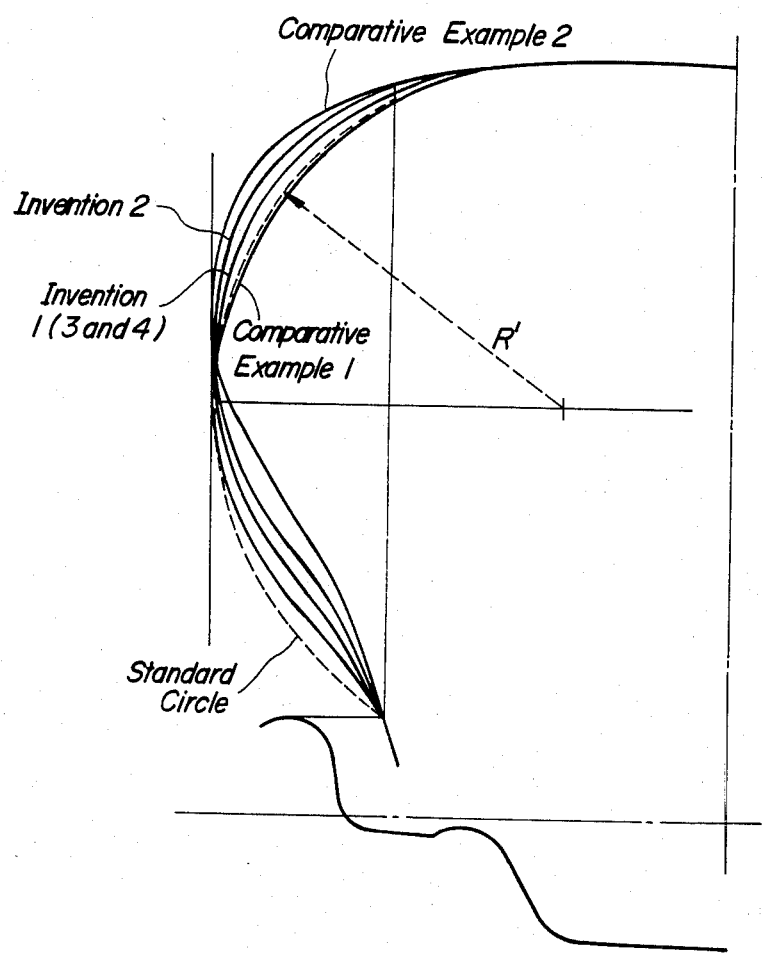
FIG. 9 schematically illustrates carcass radial surface profiles of comparative examples and according to the invention.

The carcass radial surface profiles of these tires are shown in FIG. 9. The profiles of the tires of invention 3 and 4 are substantially the same as that of invention 1.

The rolling resistances of these tires are shown in Table 2, wherein the rolling resistances of the tire of comparative example 1 are assumed 100 as index numbers.

From this viewpoint, the tires 1 and 2 according to the invention are the most suitable in order to exhibit the effect of the invention to the maximum extent. However, even the tires 3 and 4 according to the invention bring about the substantial effect of the invention to 6–10% improve or reduce the rolling resistance in comparison with the comparative example 1.

In this manner, the tires according to the invention improve or reduce the rolling resistance by increasing the carcass maximum width position and the carcass curvature reverse position, or enlarging within the suitable values the curvature of carcass in the radially outer zone of the carcass maximum width position and simultaneously the carcass curvature reverse extent in the radially inner zone of the sidewalls. It is evident from the case of the comparative example 2 that no effect can be accomplished if these values are too high extremely for the reason above described.

Table 3 shows cornering powers in comparison of the tire 1 according to the invention with the tire 1 of comparative example, wherein the cornering power of the latter is assumed 100 as index number. The larger the index number, the better is the steering performance. It can be seen from Table 3 that according to the invention the steering performance can be improved as well as the rolling resistance.

TABLE 3

Comparison of steering performance

| Performance | Tire Comparative example 1 | Invention 1 |
|---|---|---|
| Cornering power kg/deg | 100 | 105 |

Moreover, the drum for the test was formed on its cylindrical surface with protrusions which cause forces on the rotating axle of the tires during the rotation. The forces on the axle were measured to obtain comparative data of the riding comfortability against vibration as shown in Table 4. The larger the index number in Table 4, the better is the riding comfortability against vibration. It should be understood that the tire according to the invention is superior in the riding comfortability against vibration and particularly improves the comfortability greatly at high speeds from the data of reaction in horizontal directions.

TABLE 4

Comparison of riding comfortability

| Measured item | Condition | Comparative example 1 | Invention 1 |
|---|---|---|---|
| Reaction in vertical direction upon riding over protrusion | low speed | 100 | 101 |
|  | high speed | 100 | 102 |
| Reaction in horizontal direction upon riding over protrusion | low speed | 100 | 101 |
|  | high speed | 100 | 111 |

Note:
Low speed: 20-50 km/H
High speed: 60-120 km/H

Furthermore, the inventors compared wet performances of these tires on concrete roads (skid number SN=35 indicating the roughness of the roads) and on asphalt roads (SN=50) to find that the tires according to the invention are not inferior in the wet performance to the tires of comparative examples.

Moreover, the inventors compared distances over which these tires traveled on the drum under high load and high inner pressure until they were damaged. They found that the tires according to the invention are not inferior in durability to those of the comparative examples.

As can be seen from the above description, the tires according to the invention can remarkably improve or reduce the rolling resistance without adversely affecting wet performance and durability and also effectively improve the steering stability and the riding comfortability against vibration. Furthermore, the method according to the invention facilitates the manufacture of tires having considerably improved various performances.

It is further understood by those skilled in the art that the foregoing description is that of preferred embodiments of the disclosed tires and that various changes and modifications may be made in the invention without departing from the spirit and scope thereof.

What is claimed is:

1. In a reduced rolling resistance pneumatic radial tire including a pair of annular sidewalls having at inner ends bead portions, respectively, a crown portion extending between radially outer ends of said sidewalls, a carcass of at least one ply including organic fiber cord layers and having ends extending about bead wires embedded in said bead portions with distal ends extending radially outwardly to reinforce said bead portions, said sidewalls and said crown portion, and hard rubber fillers filled in turns of said ply extending about said bead wires, the improvement comprising said carcass having, on each side of a plane including an equatorial line of the tire in a radial cross-section passing through a rotating axis of the tire, an outwardly extending configuration with a center of a radius of curvature positioned in an inside of the carcass in a radially outer zone from a carcass maximum width position to said crown portion and further having an inwardly extending configuration continuous with said outwardly extending configuration with a center of a radius of curvature positioned in an outside of said carcass in a radially inner zone from said carcass maximum width portion to said bead portion when said tire mounted on a rim is filled with an inner pressure 5% of a normal inner pressure; said outwardly extending configuration of said carcass in said radially outer zone being maintained permitting a small change in configuration, while said inwardly extending configuration of said carcass in said radially inner zone being changed into a modified inwardly extending configuration with an increased radius of curvature when said tire on the rim is filled with the normal inner pressure; and a height of said carcass maximum width portion from a bead base being within a range of 50-65% of a height of the outermost portion of said crown portion from said bead base and a height of a junction of said outwardly and inwardly extending configurations from said bead base being within a range of 20-35% of said height of the outermost portion of said crown portion when said tire on the rim is filled with said normal inner pressure and equilibrated.

2. A tire as set forth in claim 1, wherein said change in configuration is within a range of 5-10% of said height of the junction of said outwardly and inwardly extending configurations when said inner pressure is increased to said normal inner pressure.

3. A tire as set forth in claim 1 wherein each said hard rubber filler is tapered off from a position adjacent to upper portion of said bead wires to at least the junction of said outwardly and inwardly extending configurations.

4. A tire as set forth in claim 3, wherein said distal end of said carcass extends beyond a radially outer end of said hard rubber filler but does not extend beyond said carcass maximum width position.

5. A tire as set forth in claim 1, wherein each said hard rubber filler has a hardness 80°-97° in Shore A.

6. A tire as set forth in claim 1, wherein each said hard rubber filler has a loss tangent of 0.15–0.25 and a loss modulus of $8.0 \times 10^7 - 2.5 \times 10^8$ dyn/cm².

7. A tire as set forth in claim 2, wherein each said hard rubber filler is tapered off from a position adjacent to upper portion of said bead wires to at least the junction of said outwardly and inwardly extending configurations.

8. A tire as set forth in claim 7, wherein said distal end of said carcass extends beyond a radially outer end of said hard rubber filler but does not extend beyond said carcass maximum width position.

9. A tire as set forth in claim 2, wherein each said hard rubber filler has a hardness 80°–97° in Shore A.

10. A tire as set forth in claim 3, wherein each said hard rubber filler has a hardness 80°–97° in Shore A.

11. A tire as set forth in claim 4, wherein each said hard rubber filler has a hardness 80°–97° in Shore A.

12. A tire as set forth in claim 2, wherein each said hard rubber filler has a loss tangent of 0.15–0.25 and a loss modulus of $8.0 \times 10^7 - 2.5 \times 10^8$ dyn/cm².

13. A tire as set forth in claim 3, wherein each said hard rubber filler has a loss tangent of 0.15–0.25 and a loss modulus of $8.0 \times 10^7 - 2.5 \times 10^8$ dyn/cm².

14. A tire as set forth in claim 4, wherein each said hard rubber filler has a loss tangent of 0.15–0.25 and a loss modulus of $8.0 \times 10^7 - 2.5 \times 10^8$ dyn/cm².

15. A tire as set forth in claim 5, wherein each said hard rubber filler has a loss tangent of 0.15–0.25 and a loss modulus of $8.0 \times 10^7 - 2.5 \times 10^8$ dyn/cm².

16. In a reduced rolling resistance pneumatic radial tire including a pair of annular sidewalls having at inner ends bead portions, respectively, a crown portion extending between radially outer ends of said sidewalls, a carcass of at least one ply including organic fiber cord layers and having ends extending about bead wires embedded in said bead portions with distal ends extending radially outwardly, at least two belt layers consisting of rubber coated high modulus cords arranged at comparatively small angles with respect to a central circumferential line of the tire and intersecting with each other encircling said carcass to reinforce therewith said sidewalls and said crown portion, and hard rubber fillers filled in turns of said ply extending about said bead wires, the improvement comprising said carcass having, on each side of a plane including an equatorial line of the tire in a radial cross-section passing through a rotating axis of the tire, a radial surface profile so selected that a ratio of radii R/R' is within a range of 0.65–0.85 and f is within a range of 5–10 mm when said tire mounted on a normal rim is filled with a normal inner pressure where R' is a radius of a standard circle passing through points B, E and C, where the point B is an intersection of the carcass and a line extending in parallel with said rotating axis and passing through a point at which a flange of said rim starts leaving the tire, the point C is an intersection of the carcass and a line extending through the point B and perpendicular to said rotating axis of the tire and the point E is an intersection of a line extending through a middle point D of a line segment BC and in parallel with said rotating axis and a line extending through a carcass maximum width point F and perpendicular to the rotating axis, and R is a radius of profile curvature of a shoulder passing through said point C, and where f is the maximum distance between an arc of said standard circle and the remaining carcass line smoothly, extending from said profile curvature of said shoulder to said point B having a single carcass curvature reverse position.

17. A tire as set forth in claim 16, wherein said profile curvature of said shoulder passes through points F, I and C, where the point I is an intersection of the carcass and a line extending in parallel with the rotating axis through a middle point H of a line segment GC, where a point G is an intersection of the line segment BC and a line extending through said carcass maximum width point F in parallel with said rotating axis.

* * * * *